Figure 1:
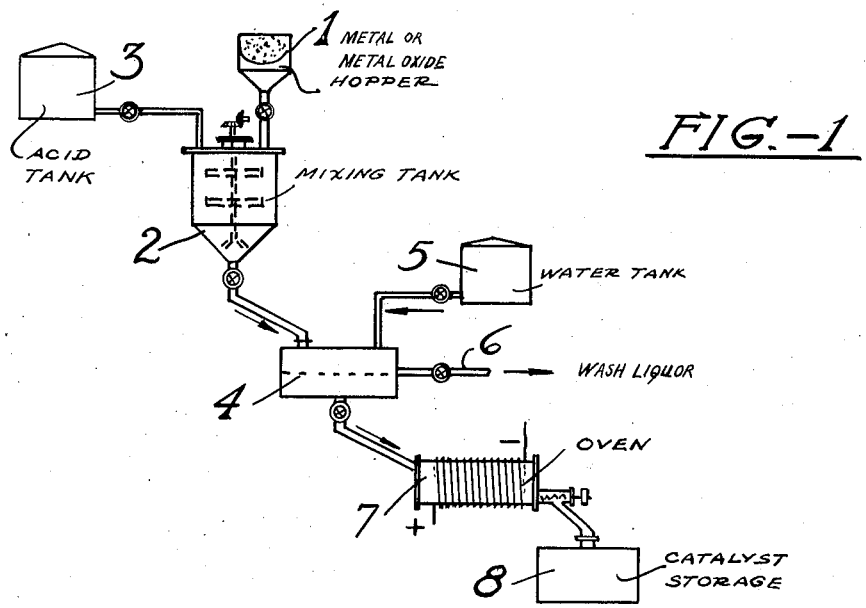

March 19, 1940.  M. PIER ET AL  2,194,186

CATALYTIC TREATMENT OF COMBUSTIBLE CARBONACEOUS MATERIALS

Original Filed Dec. 28, 1935

Mathias Pier
Walter Simon  Inventors
Paul Jacob
By P. L. Young  Attorney

Patented Mar. 19, 1940

2,194,186

UNITED STATES PATENT OFFICE 2,194,186

CATALYTIC TREATMENT OF COMBUSTIBLE CARBONACEOUS MATERIALS

Mathias Pier, Heidelberg, and Walter Simon and Paul Jacob, Ludwigshafen-on-the-Rhine, Germany, assignors to Standard-I. G. Company, Linden, N. J., a corporation of Delaware Original application December 28, 1935, Serial No. 56,532. Divided and this application November 7, 1936, Serial No. 109,746. In Germany December 29, 1934

5 Claims. (Cl. 196—53)

This application is a divisional application of our copending application Serial No. 56,532 filed on December 28, 1935, now U. S. Patent No. 2,154,527, which describes a process for the production of valuable hydrocarbon products by catalytic treatment of combustible carbonaceous materials with added hydrogenating gases employing as a catalyst a porous siliceous material the activity of which has been increased by treating it prior to its use with fluorine or compounds of fluorine, as compared with the present application which is concerned with materials other than siliceous materials.

The present invention relates to improvements in the catalytic treatment of combustible carbonaceous materials, preferably in the treatment with added hydrogenating gases of distillable carbonaceous materials and more particularly to improved catalysts or carriers for catalytic substances for use in said processes. We have found that in carrying out said processes remarkable advantages are obtained by working in contact with catalytic substances or carriers for catalytic substances or both, which consist or consist for a great part of metals or metal compounds or mixtures of said substances, the activity of which has been increased prior to their application by treatment with fluorine, hydrogen fluoride or other compounds of fluorine capable of corroding the said substances, the contact with hydrogen fluoride being made by a method other than chemical precipitation.

Examples of compounds having a like action as fluorine or hydrogen fluoride are fluosilicic acid which is employed above its decomposition temperature and fluorides of ammonium, in particular acid ammonium fluoride. Said compounds frequently exercise their effect by decompositions yielding hydrogen fluoride under the conditions of activation.

Probably the presence of a little moisture is necessary to further the action of fluorine and also possibly of the compounds of fluorine, and if sufficient moisture is not present in the activating system suitable amounts of water or water vapor may be introduced.

The fluorine or hydrogen fluoride may, if desired, be prepared in situ.

The activation treatment with hydrogen fluoride may be carried out in the liquid phase with solutions thereof. As a rule when working in the liquid phase aqueous solutions of hydrogen fluoride are employed, usually of at least 5 per cent strength, say 6 to 15 per cent, for example, 10 per cent. If desired, stronger solutions or weaker solutions of hydrogen fluoride may be employed, the conditions of treatment being modified accordingly to give the desired variation of the surface of the said substances. The materials may be treated in the form of a suspension or paste with said solutions. Pastes containing equal amounts by weight of liquid and solid matter may be employed with advantage. Usually the activation treatment in the liquid phase is carried out at room temperature, but elevated temperatures may be employed if required, for example, when working with weak solutions or when treating substances which are corroded with difficulty.

The treatment in the liquid phase may also be carried out with solutions of acid ammonium fluoride.

The activation may also be carried out in the gas phase with fluorine or hydrogen fluoride or other fluorine compounds having a like action, as a rule at elevated temperature. The temperatures employed for activation in the gas phase will not usually exceed 500° C.

After the activation treatment in accordance with the present invention, particularly when activating carriers, the activated material may be washed, for example with water. The washing treatment is, if necessary, followed by a drying treatment. In case a catalyst substance is to be deposited on an activated carrier, the carrier may be dried after or before said deposition, as required.

The duration of the aforesaid activation treatments depends on the nature of the materials undergoing activation and on the nature of the activating agents employed and their concentration. The duration may be chosen so short that only an etching of the material takes place, but in general the treatment is continued until a loss of weight of a few per cent say 5 per cent up to 10 to 30 per cent of the activated material occurs, if said material is treated in the liquid phase or washed out.

Several of the substances comprising fluorine used in accordance with the present invention may be employed simultaneously.

Other substances such as other halogens, for example chlorine, bromine or iodine or other hydrogen halides or hydrogen sulphide or the like may be present simultaneously in the activation treatment according to the present invention. Sometimes regulated amounts thereof may improve the activation, and usually they do no harm. In cases where impurities have a deleterious effect it is advantageous to remove from the reagent substances present in the activation treatment.

As examples of metals and metal compounds which may be activated by treatment with fluorine or hydrogen fluoride or other compounds of fluorine may be mentioned Zn, Mg, Ti, Zr, V, Cr, Mn, rare earth metals and the metals of the iron group of the periodic system and their compounds, preferably their oxides. Aluminous substances as for instance alumina and especially activated alumina may advantageously serve as catalysts after being treated in the desired manner.

The aforesaid substances may be treated at ordinary or elevated temperature up to 500° C. with fluorine or hydrogen fluoride, for example, in the form of hydrofluoric acid, or other compounds of fluorine. For example, a metal may be treated with gaseous hydrogen fluoride at about 100° C. for about 3 to 6 hours.

The pretreated metals and metal compounds may be employed as catalysts themselves or as components of catalytic materials containing also other catalysts. The said metal and metal compounds, preferably activated alumina, may also be employed as carriers for catalysts. They may be impregnated in known manner with a catalytically acting metal compound, as for example a thio salt, nitrate, phosphate, sulphate, chromate, oxalate, molybdate, tungstate and the like, which is dissolved in an aqueous or organic liquid. Also a metal compound may be precipitated from a solution of a metal salt in the presence of the activated carrier, for example, iron sulphide may be precipitated from solutions of iron sulphate by means of ammonium sulphide, or iron chromate by means of ammonium chromate. The catalyst substance may also be adsorbed from a colloidal solution thereof by means of a carrier pretreated in accordance with the present invention. Where more convenient the catalyst substance may first be deposited on the carrier, and the catalyst thus obtained then activated in accordance with the present invention.

The catalyst substance or carrier therefor or catalyst activated by treatment with fluorine, hydrogen fluoride or the like may be subjected to an after-treatment with hydrogen, hydrogen halide or hydrogen sulphide at elevated temperature. For instance, in cases where the improved catalyst activity is reduced by the subsequent washing treatment, for example, with water, it is desirable to subject the washed materials to a treatment to restore said catalyst activity. For example activated materials containing metal sulphides which have been washed may be subjected to treatment at elevated temperature and preferably under pressure with hydrogen sulphide or like sulphidizing agents.

Figure 2:
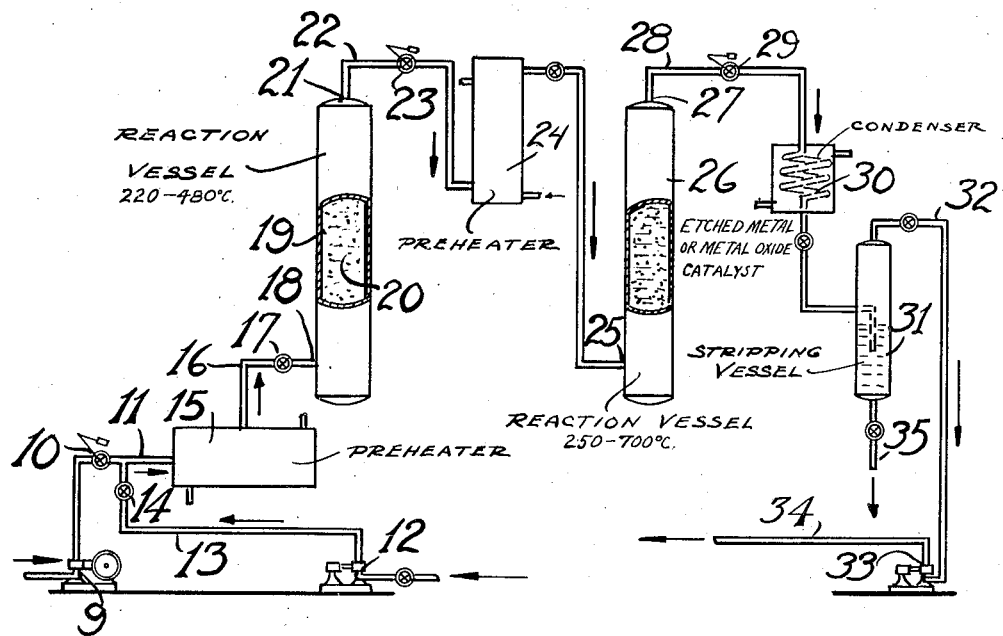

Referring to the drawing, Figure 1 is a diagrammatic sketch in partial sectional elevation of a suitable apparatus for the preparation of the improved catalysts of this invention and indicates the flow of materials. Figure 2 is a diagrammatic sketch in partial sectional elevation of suitable apparatus for the catalytic treatment of carbonaceous materials by the process of this invention and also indicates the flow of materials in such a process.

Referring to Figure 1, the metal or metal oxide from which the catalyst is to be made is fed from a hopper 1 into a mixing tank 2. Aqueous hydrofluoric acid or a substance giving rise thereto is also introduced from an appropriate storage 3 and the materials are agitated for a sufficient period and then passed into a wash tank 4 into which water is added from a source 5 and discarded wash liquor is withdrawn by pipe 6. The washed catalyst is then passed to an oven 7 which is preferably heated by electric means and thereafter the finished catalyst is stored at 8.

Referring to Figure 2, fresh gas is introduced by means of a compressor 9 and a pressure valve 10 into a pipe 11 where it is joined with the vapors of a middle oil heated to at least 220° C., and which is introduced by way of a pump 12, pipe 13, and valve 14. The mixture is preheated in the preheater 15 to the reaction temperature and then passed by way of pipe 16 and valve 17 at inlet 18 into the first reaction vessel 19 which is filled with a strongly hydrogenating catalyst 20. The products leave the reaction vessel 19 at 21 and pass by way of pipe 22, pressure control valve 23, preheater 24 and inlet 25 into a second reaction vessel 26 which is filled with a non-siliceous catalyst maintained at 250° to 700° C. and at a pressure of at least 20 atmospheres. The products leave the reaction vessel 26 at 27 and pass by way of pipe 28 and valve 29 into the condenser 30, thence into a stripping vessel 31 where the liquid products are separated from the gaseous products. The gases may be withdrawn through pipe 32 and returned to the process by way of circulatory pump 33 and pipe 34. The liquid products collected in the stripping vessel 31 may be withdrawn at outlet 35.

The great advantage obtained with catalysts prepared in accordance with the present invention consists in that very small amounts of a highly catalytically active metal compound supported on a carrier activated by treatment with fluorine, hydrogen fluoride or like corrosive fluorine compounds yields practically the same results as a large amount of the same metal compound and thus a considerable reduction in expenses for the catalyst is attained. Thus, for example, a metal treated with fluorine and provided with about 10 per cent of tungsten sulphide has the same activity as about ten times the amount of tungsten sulphide by itself. When converting middle oils into benzines by destructive hydrogenation with said catalysts a product with a high octane number is obtained whilst the formation of gaseous hydrocarbons is very low and the present invention is of particular advantage for said treatment. When applying the present catalysts their advantages become particularly apparent when they are stationarily contained in the reaction vessel, and the reagents are passed thereover, but said catalysts may also be employed finely dispersed in the reagents.

With such liquid initial materials as are liable to give rise to the formation of deposits on the catalysts, such as oils poor in hydrogen obtained from solid carbonaceous materials by destructive hydrogenation, low-temperature carbonization, coking or extraction, or distillation products thereof and especially oils containing oxygen as for example, tar fractions containing phenols, it is preferred to first pass the initial material together with hydrogenation gases under pressure at temperatures from about 220° to 480° C. over strongly hydrogenating catalysts, in particular heavy metal sulphides, and only then to subject the initial material preferably after separation of any low boiling constituents contained therein, to a main treatment with hydrogenating gases, suitably in vapor phase, in the presence of preferably stationarily arranged catalysts, which have been prepared in accordance with the present invention.

For the preliminary treatment with hydrogenating gases in particular the sulphides of the heavy metals of the 4th to 8th groups of the periodic system, as for example, of tungsten, molybdenum, chromium or cobalt may be employed as strongly hydrogenating catalysts. Other strongly hydrogenating catalysts, as for example, oxides of the metals of the 6th group of the periodic system may also be used. The pressures employed in this first stage are suitably from 50 to 300 atmospheres and the reaction conditions are usually such that from about 20 to 50 per cent or more of low boiling hydrocarbons are formed, while the remainder consists of a higher boiling oil rich in hydrogen. The first stage may, however, also be carried out under such conditions that the formation of low boiling constituents is suppressed to a large extent and mainly higher boiling substances rich in hydrogen are formed.

In the main treatment with hydrogenating gases the higher boiling oil rich in hydrogen is converted in an advantageous manner into low boiling hydrocarbons. This conversion is preferably carried out in the vapor phase under a pressure of from about 30 to 300 atmospheres and more and at temperatures of from about 300° to 600° C.

The low boiling hydrocarbons obtained thereby constitute an excellent motor fuel with particularly good properties, such as high anti-knock value, and may, if desired, be admixed with the low boiling constituents formed in the preliminary treatment with hydrogenating gases.

The expression "treatment with hydrogenating gases of distillable carbonaceous materials" when employed in the present application is intended to comprise various reactions. Thus the expression includes the destructive hydrogenation of carbonaceous materials, such as coal of all varieties, including bituminous coal and lignite, other solid carbonaceous materials such as peat, shales and wood, mineral oils, tars and the products of distillation, conversion and extraction of such carbonaceous materials, and it is in destructive hydrogenation that the advantages obtained in accordance with the present invention are of particular importance. The said destructive hydrogenation may be used to produce hydrocarbons of all sorts, such as motor fuels, and in particular anti-knock motor fuels, solvent naphthas, middle oils, kerosene and lubricating oils. The said expression also includes the removal of non-hydrocarbon impurities such as substances containing sulphur or oxygen or nitrogen compounds by the action of hydrogen or gases containing or supplying hydrogen from crude carbonaceous materials, for example, the refining by treatment with hydrogen of crude benzol, of crude motor fuels or of lubricating oils. The said expression further includes the conversion of oxygen- or sulphur-containing organic compounds to produce the corresponding hydrocarbons or hydrogenated hydrocarbons or decomposition products thereof, for example, the conversion of phenols or cresols into the corresponding cyclic hydrocarbons or hydrogenation products thereof. The said expression also includes such reactions as the conversion of cresol to phenol and the conversion of phenol to cyclo-hexanol. The expression also includes the improvement of the properties of motor fuels with hydrogenating gases by an aromatizing or hydroforming treatment or of lubricating oils by hydroforming.

The said reactions with hydrogen or hydrogen containing gases are usually carried out at temperatures between 250° and 700° C. and as a rule between 380° and 550° C. With particularly active catalysts in accordance with the present invention temperatures of down to about 175° C. may be employed. The pressures employed are usually in excess of 20 atmospheres and as a rule preferably in excess of 50 atmospheres. In some reactions, however, atmospheric pressure or pressures slightly above atmospheric pressure for example, pressures of 10 atmospheres may be employed. For example, in the refining of crude benzol rather low pressures, for example, of the order of 40 atmospheres give good results. Generally, however, pressures of about 100, 200, 300, 500 and in some cases even 1000 atmospheres come into question.

The amount of hydrogen maintained in the reaction space and parts connected therewith, if any, varies greatly with the nature of the particular initial materials treated or according to the result in view. In general 400, 600, 1000; 2000, 4000, 8000 cubic metres or more of hydrogen measured under normal conditions of temperature and pressure, per ton of carbonaceous materials treated may be used.

It is particularly advantageous to operate by continuously introducing fresh carbonaceous materials into the reaction vessel and to continuously remove products therefrom. Sufficiently converted reaction products may be removed after any of the reaction vessels. Materials which have not been sufficiently reacted on may be recycled or treated in an additional reaction vessel.

The carbonaceous materials may be treated in the reaction in the liquid, solid or vapor phase as required.

The reaction is advantageously carried out with streaming hydrogenating gases.

The gases for use in the reaction may consist of hydrogen alone or of mixtures containing hydrogen, for example, a mixture of hydrogen with nitrogen or water gas or of hydrogen mixed with carbon dioxide, hydrogen sulphide, water vapor or methane or other hydrocarbons.

The reaction conditions in each specific case can readily be adjusted by those skilled in the art.

We have also found that improved results are obtained in the production of liquid hydrocarbons from oxides of carbon and hydrogen and in cracking or reforming by working with catalysts, carriers or catalyst substances activated according to the present invention.

The following examples will further illustrate how the invention may be carried out in practice, but it should be understood, that the invention is not limited to the said examples. The percentages are by weight unless otherwise stated.

*Example 1*

Granulated active alumina (the granules having a diameter of from 3 to 4 millimeters) is treated with hydrofluoric acid of 10 per cent strength for a quarter of an hour, washed with water, dried, then impregnated with a solution of ammonium thiotungstate and subsequently treated at 400° C. in a hydrogen current. The finished catalyst contains 90 parts of active alumina and 10 parts of tungsten disulphide. It is rigidly arranged in a high-pressure furnace and heated to 400° C. If the vapors of a gas oil obtained by the distillation of mineral oil are led over this catalyst together with hydrogen at a pressure of 200 atmospheres, a product is obtained which contains 40 per cent of benzine boiling up to 190° C.

If the alumina impregnated with tungsten disulphide be employed as a catalyst without having been pretreated with hydrofluoric acid, a product is obtained which contains only 12 per cent of benzine boiling up to 190° C.

*Example 2*

A catalyst prepared from molecular proportions of molybdic acid, zinc oxide and magnesium oxide is treated for a quarter of an hour with hydrofluoric acid of 15 per cent strength, washed with water and dried. The catalyst thus obtained is rigidly arranged in a high-pressure vessel, and the vapors of a middle oil obtained from brown coal by destructive hydrogenation are led over this catalyst together with hydrogen at a pressure of 200 atmospheres and a temperature of 460° C. The product thus obtained consists of benzine to the extent of 60 per cent.

If the catalyst be not pretreated with hydrofluoric acid, a product is obtained which contains only 47 per cent of benzine.

What we claim is:

1. A process for the production by hydrogenation of valuable hydrocarbon products by catalytic treatment of combustible carbonaceous materials with added hydrogenating gas at a temperature of from 250 to 700° C. and under a pressure of at least 20 atmospheres which comprises employing as a catalyst a non-siliceous substance selected from the group consisting of metals and metal oxides the activity of which has been increased by treating it prior to its application with an agent selected from the group consisting of hydrogen fluoride and substances furnishing hydrogen fluoride under the conditions of activation and removing the fluorine containing agent by washing, the pretreatment with the fluorine containing agent being made by a method other than chemical precipitation.

2. A process claimed in claim 1 which comprises employing as a non-siliceous catalytic material an aluminum oxide pretreated with an agent selected from the group consisting of hydrogen fluoride and substances furnishing hydrogen fluoride under the conditions of activation and removing the fluorine containing agent by washing, the pretreatment with the fluorine containing agent being made by a method other than chemical precipitation.

3. In the process claimed in claim 1, employing as a non-siliceous catalytic material a non-siliceous substance selected from the group consisting of metals and metal oxides provided with a catalytically active agent, selected from the group consisting of metals and metal compounds incorporated therewith, and pretreated with an agent selected from the group consisting of hydrogen fluoride and substances furnishing hydrogen fluoride under the conditions of activation and removing the fluorine containing agent by washing, the pretreatment with the fluorine containing agent being made by a method other than chemical precipitation.

4. In the process claimed in claim 1, employing as a non-siliceous catalytic material an aluminum oxide provided with a catalytically active agent, selected from the group consisting of metals and metal compounds incorporated therewith, and pretreated with an agent selected from the group consisting of hydrogen fluoride and substances furnishing hydrogen fluoride under the conditions of activation and removing the fluorine containing agent by washing, the pretreatment with the fluorine containing agent being made by a method other than chemical precipitation.

5. A process for the production by hydrogenation of valuable hydrocarbon products by catalytic treatment of combustible carbonaceous materials which comprises first leading the initial material with added hydrogenating gases under pressure and at a temperature between 220 to 480° C. over a strongly hydrogenating catalyst and then further subjecting the products thus formed to a treatment with added hydrogenating gases at a temperature between 250 to 700° C. and under a pressure of at least 20 atmospheres in the presence of a non-siliceous catalytic substance selected from the group consisting of metals and metal oxides the activity of which has been increased by treating it with an agent selected from the group consisting of hydrogen fluoride and substances furnishing hydrogen fluoride under the conditions of activation, and removing the fluorine containing agent by washing, the pretreatment with hydrogen fluoride being made by a method other than chemical precipitation.

MATHIAS PIER.
WALTER SIMON.
PAUL JACOB.